(12) United States Patent
Wang et al.

(10) Patent No.: US 11,343,710 B2
(45) Date of Patent: May 24, 2022

(54) WIRELESS COMMUNICATION METHOD, APPARATUS AND SYSTEM FOR TRANSMITTING SIDELINK SIGNALS USING AN EXCEPTIONAL RESOURCE POOL

(71) Applicant: Panasonic Intellectual Property Corporation of America, Torrance, CA (US)

(72) Inventors: Lilei Wang, Beijing (CN); Joachim Loehr, Hessen (DE); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 165 days.

(21) Appl. No.: 16/330,207

(22) PCT Filed: Nov. 3, 2016

(86) PCT No.: PCT/CN2016/104454
§ 371 (c)(1),
(2) Date: Mar. 4, 2019

(87) PCT Pub. No.: WO2018/081979
PCT Pub. Date: May 11, 2018

(65) Prior Publication Data
US 2019/0208441 A1 Jul. 4, 2019

(51) Int. Cl.
*H04B 17/318* (2015.01)
*H04W 24/10* (2009.01)
(Continued)

(52) U.S. Cl.
CPC ...... *H04W 28/0284* (2013.01); *H04B 17/318* (2015.01); *H04W 24/10* (2013.01); *H04W 72/02* (2013.01); *H04W 76/23* (2018.02)

(58) Field of Classification Search
CPC .............. H04B 17/318; H04W 24/10; H04W 28/0284; H04W 72/02; H04W 76/23
See application file for complete search history.

(56) References Cited

U.S. PATENT DOCUMENTS

2006/0159016 A1   7/2006 Sagfors et al.
2014/0094183 A1*  4/2014 Gao ...................... H04W 72/04
                                                      455/450
(Continued)

FOREIGN PATENT DOCUMENTS

CN      104540236 A    4/2015
JP      2008-527908 A  7/2008
(Continued)

OTHER PUBLICATIONS

Ericsson ("Congestion Control Framework for V2V", 3GPP Draft; R1-166955; RAN WG1 Meeting; Aug. 2, 2016) (Year: 2016).*
(Continued)

*Primary Examiner* — Melvin C Marcelo
*Assistant Examiner* — Natali Pascual Peguero
(74) *Attorney, Agent, or Firm* — Seed IP Law Group LLP

(57) ABSTRACT

There are provided an apparatus, a method and a system, at a first node, and the apparatus comprises: a transmitter operative to transmit sidelink signals to a second node; and a controller operative to determine whether to use an exceptional resource pool based on at least one of a first condition and a second condition, for the transmitter to transmit sidelink signals, wherein the first condition includes that a first channel busy ratio measured during a first congestion control operation regarding a current resource pool is higher than a first threshold, and the second condition includes that at least one packet is determined to be dropped during the first congestion control operation.

17 Claims, 3 Drawing Sheets

(51) Int. Cl.
  *H04W 28/02* (2009.01)
  *H04W 72/02* (2009.01)
  *H04W 76/23* (2018.01)

(56) References Cited

U.S. PATENT DOCUMENTS

2015/0304226 A1  10/2015  Takahashi
2017/0188391 A1*  6/2017  Rajagopal ......... H04W 74/0816
2018/0048572 A1*  2/2018  Gulati .................... H04L 43/12

FOREIGN PATENT DOCUMENTS

| WO | 2014/069642 A1 | 5/2014 |
| WO | 2015/140039 A1 | 9/2015 |
| WO | 2015/170871 A1 | 11/2015 |
| WO | 2016/119282 A1 | 8/2016 |
| WO | 2016/141983 A1 | 9/2016 |

OTHER PUBLICATIONS

The Extended European Search Report dated Jul. 18, 2019 for the related European Application No. 16920787.5.

Ericsson: "Congestion Control Framework for V2V", 3GPP Draft; R1-166955 Congestion Control for V2V, 3rd Generation Partnership Project (3GPP), Mobile Competence Centre; 650, Route Des-Ucioles; F-06921 Sophia-Antipolis Cedex; France, vol. RAN WG1, No. Gothenburg, Sweden; Aug. 22, 2016-Aug. 26, 2016 Aug. 12, 2016 (Aug. 12, 2016), XP051141940, Retrieved from the Internet: URL:http://www.3gpp.org/ftp/tsg_ran/WG1_RL1/TSGR1_86/Docs/ [retrieved on Aug. 12, 2016].

International Search Report of PCT application No. PCT/CN2016/104454 dated Jul. 18, 2017.

Communication pursuant to Article 94(3) EPC dated Feb. 8, 2021 for the related European Patent Application No. 16920787.5, 8 pages.

Ericsson, "Resource allocation for exceptional pools," R1-1609730, Agenda Item: 7.2.1.5.7, 3GPP TSG RAN WG1 Meeting #86bis, Lisboa, Portugal, Oct. 10-14, 2016, 3 pages.

Eze et al., "Advances in Vehicular Ad-hoc Networks (VANETs): Challenges and Road-map for Future Development," DOI: 10.1007/s11633-015-0913-y, International Journal of Automation and Computing, Feb. 2016, 18 pages.

Zte, "Discussion on congestion control of PC5 carrier," R1-1609808, Agenda Item: 7.2.1.5.1, 3GPP TSG-RAN WG1 Meeting #86bis, Lisbon, Portugal, Oct. 10-14, 2016, 3 pages.

* cited by examiner

UE Autonomous Resource Selection

WIRELESS COMMUNICATION METHOD, APPARATUS AND SYSTEM FOR TRANSMITTING SIDELINK SIGNALS USING AN EXCEPTIONAL RESOURCE POOL

BACKGROUND

1. Technical Field

The present technology relates to wireless communication field, and more particular, to a wireless communication method, apparatus and system.

2. Description of the Related Art

In a wireless communication field, end-user radio or wireless terminals, also known as user equipments (UEs), communicate via a wireless network such as a radio access network (RAN) with a radio base station (RBS), also called "eNodeBs" (eNBs). The radio access network (RAN) covers a geographical area which is divided into cell areas, with each cell area being served by a radio base station. And in Device-to-Device (D2D) communication field, a UE can wirelessly communicate sidelink signals with other UEs based on congestion control on a resource pool.

Other than a traditional, normal resource pool, an exceptional resource pool concept was introduced for D2D (3GPP LTE Release-12/13 (Rel-12/13)) in order to minimize service interruption. That is, exceptionally, a UE can autonomously switch from scheduled resource allocation mode to autonomous resource allocation mode by using resources from a commTxPoolExceptional message under certain conditions which are detailed in the following.

For Rel-13, in only three following conditions, a UE shall configure lower layers to transmit the sidelink control information (SCI) and the corresponding data by using the exceptional resource pool, and the three conditions are:

Radio Link Failure (RLF): if a timer T310 or T311 is running; and if a primary cell (PCell) at which the UE detected physical layer problems or radio link failure broadcasts a SystemInformationBlockType18 message including a commTxPoolExceptional flag; or Radio Resource Control (RRC) Connection Reestablishment: if a timer T301 is running and a cell at which the UE initiated connection re-establishment broadcasts a SystemInformationBlockType18 message including a commTxPoolExceptional flag.

In RRC Idle: if a SystemInformationBlockType18 message does not include a commTxPoolNormalCommon flag.

In this case, from the moment the UE initiates connection establishment until receiving an RRCConnectionReconfiguration message including a sl-CommConfig flag or until receiving an RRCConnectionRelease message or an RRCConnectionReject message.

It has been agreed in 3gpp RAN1 that, in vehicle-to-X (V2X)/vehicle-to-vehicle (V2V) UE autonomous resource selection, sensing with semi-persistent transmission is used for resource selection. A UE transmits a Physical Sidelink Shared Channel (PSSCH) data (when the data is available) on a selected set of periodically occurring resources until a resource reselection occurs. The UE can indicate the reservation of future resource in a Scheduling Assignment (SA) channel. By decoding the SA channel from the past, the UE knows which resources are not available for transmission in the future. Sensing is done within a sensing window (e.g., 1000 ms) before packets' arrival, as shown in FIG. 1. Both SA decoding and energy measurement are supported for the sensing.

In V2X/V2V, in order to increase the efficiency of the resource usage, a traffic with different priorities can share the same resource pool. The priority is indicated in the Sidelink Control Information (SCI) and used for resource selection. The overall basic principle of sensing with semi-persistent transmission for V2X/V2V UE autonomous resource selection is described with reference to FIG. 1 as below. FIG. 1 schematically shows an application scenario for UE autonomous resource selection mode in the prior art.

Based on latest RAN1 agreements and specifications, there are basically few steps to carry out the detailed resource selection for UE autonomous resource selection mode, for example Step 1: All the resources are considered available.

Step 2: the UE excludes resources based on SA decoding and measured Sidelink Reference Signal Received Power (S-RSRP), and finds out available resources with a certain ratio of the number of the total resources.

Step 3: the UE selects its transmission resource from the resources not excluded based on ranking measured Sidelink Received Signal Strength Indicator (S-RSSI).

With these three steps, the UE uses the selected transmission resource to transmit sidelink signals to other UEs.

SUMMARY

Congestion control was discussed in RAN1 and many companies supported to do congestion control in the physical layer to satisfy the European Telecommunications Standards Institute (ETSI) regulation. But how to combine congestion control function with current sensing/resource selection procedures in layer one (L1) V2V standard (like three steps mentioned above) is not clear. The congestion control may cause packet dropping for some UE & Applications, for example, when a measured channel busy ratio is high. At the same time, there might be available capacity in the system (e.g. in the Exceptional Resources).

According to one aspect of the present invention, there is provided an apparatus, at a first node, comprising: a transmitter operative to transmit sidelink signals to a second node; and a controller operative to determine whether to use an exceptional resource pool based on at least one of a first condition and a second condition, for the transmitter to transmit sidelink signals, wherein the first condition includes that a first channel busy ratio measured during a first congestion control operation regarding a current resource pool is higher than a first threshold, and the second condition includes that at least one packet is determined to be dropped during the first congestion control operation.

According to another aspect of the present invention, there is provided a method, at a first node, comprising: a step of transmitting sidelink signals to a second node; and a step of determining whether to use an exceptional resource pool based on at least one of a first condition and a second condition, for the transmitter to transmit sidelink signals, wherein the first condition includes that a first channel busy ratio measured during a first congestion control operation regarding a current resource pool is higher than a first threshold, and the second condition includes that at least one packet is determined to be dropped during the first congestion control operation.

According to still another aspect of the present invention, there is provided a system, at a first node, comprising: one or more processors; a memory coupled with the one or more processors, when executed by the one or more processors, to perform the method as mentioned above.

DETAILED DESCRIPTION

Embodiments will now be described with reference to FIGS. 2 through 5, which relate to a wireless communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1:
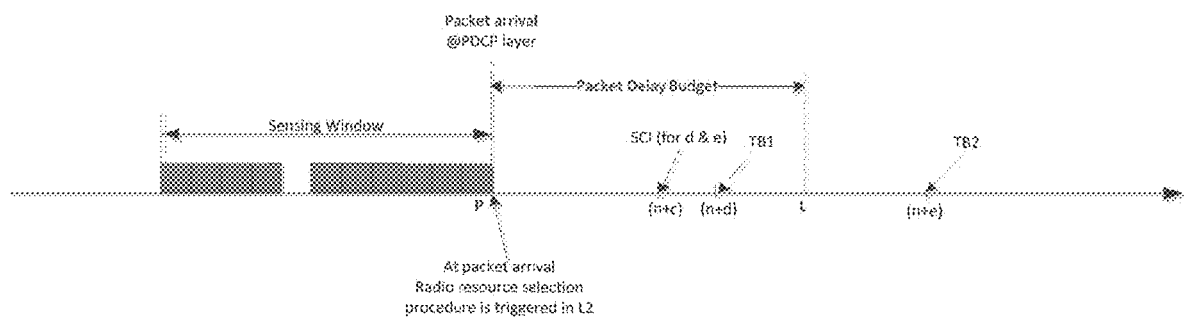
FIG. 1 schematically shows an application scenario for UE autonomous resource selection mode in the prior art.
Figure 2:
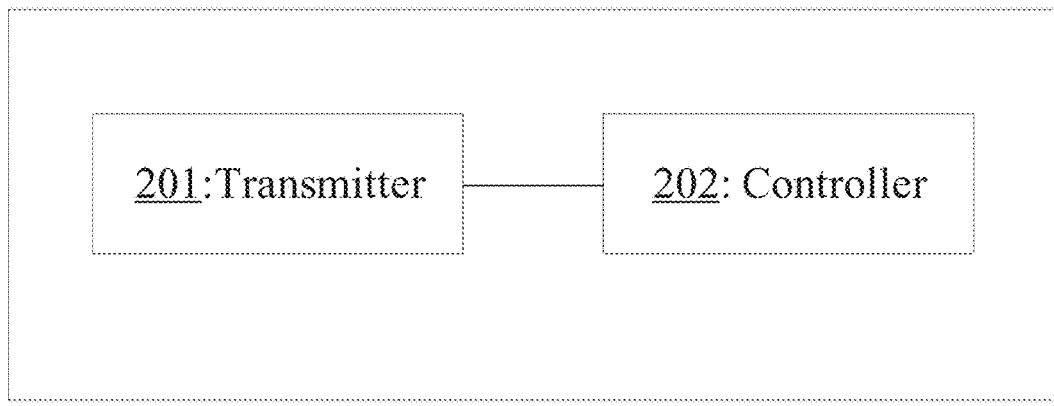
FIG. 2 schematically shows a block diagram of an apparatus at a first node according to an embodiment of the present invention.

FIG. 2 schematically shows a block diagram of an apparatus 200 at a first node according to an embodiment of the present invention.

The apparatus 200 includes: a transmitter 201 operative to transmit sidelink signals to a second node; and a controller 202 operative to determine whether to use an exceptional resource pool based on at least one of a first condition and a second condition, for the transmitter to transmit sidelink signals, wherein the first condition includes that a first channel busy ratio measured during a first congestion control operation regarding a current resource pool is higher than a first threshold, and the second condition includes that at least one packet is determined to be dropped during the first congestion control operation.

Thus, the exceptional resource pool is not only used in the only three conditions mentioned in the prior art (e.g., RLF, RRC Connection Reestablishment, and RRC Idle as the agreed Rel.13/Rel.14 conditions), but also used in new conditions, such as the at least one of the first condition and the second condition. The first condition and the second condition both are related to a first congestion control performed on the current resource pool (not including the exceptional resource pool). So during the first congestion control performed on the current resource pool, in a condition that a first channel busy ratio measured during the first congestion control operation regarding a current resource pool is higher than a first threshold, or in a condition that at least one packet is determined to be dropped during the first congestion control operation, or in a condition that the first channel busy ratio measured during the first congestion control operation regarding the current resource pool is higher than a first threshold and at least one packet is determined to be dropped during the first congestion control operation, the exceptional resource pool can be considered to be used to expand the available resources to be selected for transmitting signals, so that the packets can be prevented from being dropped or can be dropped less, and the resources can be maintained not too congested, and the resource utilization can be optimized.

To be noted that the first node and the second node may be both UEs, and they communicate sidelink signals between them. And the UEs are in UE autonomous resource allocation mode.

The concept of channel busy ratio (CBR) mentioned herein generally means how many resources of the total resources are occupied based on a certain signal strength to reflect congestion situation in the wireless communication, and it can be observed at both UE side and eNB side or reported by the UE to the eNB. By measuring the CBR, the UE or eNB could take relevant action for congestion control based on a degree of the CBR. Therefore, the CBR measurement is a basis for congestion control. And the larger the CBR is, the more congested the resources are.

As an example but not for limitation, the CBR can be measured by the following formula (1)

$$CBR = \text{occupied number/total number} \qquad \text{formula (1)}$$

The occupied number indicates a number of calculation units of radio signal which have powers larger than a power threshold, and the total number indicates a total number of the calculation units of radio signal as mentioned above.

The calculation units of radio signal for CBR may include one or more physical resource blocks (PRBs), or one or more resource block groups (RBGs) or other units for calculating the powers, and the powers may include radio signal power strength, or power spectrum density or others for evaluating the power degree or usage degree.

However, the details mentioned on the CBR is only for illustration, but not for limitation, and other concepts equivalent to the CBR to represent the congestion degree of the resource pool can be also utilized herein to replace the CBR.

In an embodiment, the controller 202 is operative to determine to use the exceptional resource pool further in a third condition, wherein the third condition includes that a second channel busy ratio measured during a second congestion control operation regarding the exceptional resource pool is lower than a second threshold.

Thus, in the at least one of a first condition and a second condition, whether to the exception resource pool is further based on the congestion degree of the exception resource pool, and if the second channel busy ratio measured during a second congestion control operation regarding the exceptional resource pool is lower than a second threshold, which means the exceptional resource pool is not so congested, the exception resource pool can be used, thereby guaranteeing that the exceptional resource pool is not overused.

In an embodiment, the second threshold is same with or different from the first threshold. Actually, the first threshold for judging whether the current resource pool (not including the exceptional resource pool) is congested can be different from the second threshold for judging whether the exceptional resource pool is congested, or can be the same with the second threshold. The present invention does not limit it.

In an embodiment, the controller 202 is operative to determine to use the exceptional resource pool further in a fourth condition, wherein the fourth condition includes that priority of the at least one packet determined to be dropped is higher than a third threshold. In an embodiment, the priority may be e.g., ProSe Per-Packet Priority (PPPP), or may be (pre-) configured by other rules.

Thus, in the condition that the at least one packet is determined to be dropped, whether to use the exceptional resource pool to transmit such at least one packet is further based on the priority of the at least one packet, because if the priority of the at least one packet is too low (or lower than or equal to the third threshold), which means the at least one packet is not so important, and can be dropped, such at least one packet is to be dropped without occupying the exceptional resource pool. However, if the priority of the at least one packet is higher than the third threshold, which means the at least one packet may be important, and should not be dropped, such at least one packet can be transmitted by occupying the exceptional resource pool, thereby further improving the resource utilization.

In another embodiment, which UEs (i.e., the first node) are capable of selecting resources from the exceptional resource pool can also be (pre) configured or based on priorities of the UEs.

In an embodiment, the controller 201 is operative to determine whether to use the exceptional resource pool in a first step (i.e., the step 2 mentioned in the background portion) of determining a subset of resources to be excluded during Physical Sidelink Shared Channel (PSSCH) resource selection or in a second step (i.e., the step 3 mentioned in the background portion) of ranking candidate resources based on measured S-RSSI (Sidelink Received Signal Strength Indicator) and selecting resources after performing the first step.

Figure 3:
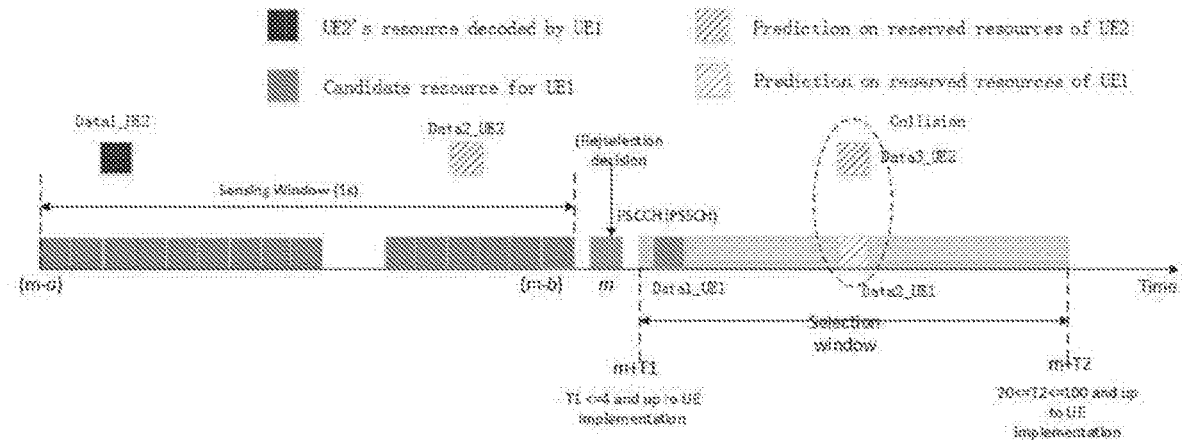
FIG. 3 schematically shows an application scenario for a step 2 of UE autonomous resource selection.

The details are described with reference to FIG. 3 as below. FIG. 3 schematically shows an application scenario for a step 2 of UE autonomous resource selection.

In an embodiment, in a case that the controller 202 is operative to determine whether to use the exceptional resource pool in the first step (i.e., step 2 of V2X/V2V UE autonomous resource selection as shown in FIG. 3), the controller 202 is operative to: increase a S-RSRP (Sidelink Reference Signal Received Power) threshold to allow more candidate resources within a resource selection window for a predetermined number of times until substantially m % resources of total resources are available; if a channel busy ratio (CBR) measured within a CBR measurement window is higher than a fourth threshold, determine to use the exceptional resource pool without performing the second step (i.e., the step 3 of V2X/V2V UE autonomous resource selection); and if CBR measured within a CBR measurement window is not higher than the fourth threshold, perform the second step.

In particular, in step 2 (i.e., the UE procedure for determining the subset of resources to be excluded in PSSCH resource selection), it is required that the UE should find m % (e.g., 20%) available resources of total resources within a selection window. If an initial operation on excluding resources based on the measured Reference Signal Received Power (RSRP) cannot guarantee m % available resources, the UE will increase e.g., 3 dB for the S-RSRP threshold for a limited number of times until the UE find substantially m % resources (e.g., m is 20) for the resource selection in step 3. To be noted that, because the number of times for increasing 3 dB each time is limited, the UE may not find exactly m % resources (e.g., m is 20) for the resource selection, but may find almost or nearly m % resources (e.g., 19%, 18%, and so on) for the resource selection. So the ratio of the available resources to the total resources may not be limited to exactly m %.

Some details are described in FIG. 3. A UE1 will decide whether a candidate resource Data1_UE1 is excluded or not in step 2. Assuming that the UE1 has decoded the SA signal and knows a UE2's reservation (i.e., reserved resources), for example Data1_UE2, Data2_UE2 and Data3_UE2 and so on, if the measured S-RSRP of Data1_UE2 is larger than the S-RSRP threshold (for example, S-RSRP threshold 1 in the following table 1), the UE1 should exclude the candidate resource Data2_UE1. Note that the S-RSRP threshold is obtained from a certain threshold table configured by RRC or preconfigured in the specification, and the UEs know such value based on transmission packet's priority and the priority indicated in the decoded SA. The table 1 is as follows

TABLE 1

| Configured or preconfigured S-RSRP threshold table | | |
|---|---|---|
| | Priority 1 in decoded SA | Priority 2 in decoded SA |
| Priority 1 of transmission packet | S-RSRP threshold 1 | S-RSRP threshold 2 |
| Priority 2 of transmission packet | S-RSRP threshold 3 | S-RSRP threshold 4 |

The UE will repeat such procedure based on the decoded SA and the transmission packet and finally determine available candidate resources.

In particular, in the end of the step 2, if the channel busy ratio (CBR) on the determined available candidate resources within the congestion control measurement window (e.g., 100 ms) exceeds a certain new_threshold_1, the UE directly uses the exceptional resource pool for resource transmission and will not go to step 3. Otherwise, UE will go to step 3 based on normal resource pool (not including the exceptional resource pool).

In an embodiment, in a case that the controller 202 is operative to determine whether to use the exceptional resource pool in the first step (i.e., the step 2 of V2X/V2V UE autonomous resource selection), the controller 202 is operative to: calculate a ratio of the number of the available resources to the number of all resources without increasing a S-RSRP (Sidelink Reference Signal Received Power) threshold; if the ratio is smaller than a fifth threshold, determine to use the exceptional resource pool without performing the second step; if the ratio is not smaller than the fifth threshold, perform the second step.

In this embodiment, the UE will not increase 3 dB for S-RSRP threshold and find more available resources. If the ratio of the number of candidate resources to the number of all resources within a selection window is smaller than a certain new_threshold_2 (e.g., 5% or 10% of total candidate resources in step 1), the UE will use exceptional pool for transmission.

In an embodiment, the first step (step 2) includes increasing a S-RSRP threshold to allow more candidate resources within a resource selection window until substantially m % resources of total resources are available and not including the congestion control operation, in a case that the controller 202 is operative to determine whether to use the exceptional resource pool in the second step (step 3) after performing the first step (step 2), the controller 202 is operative to: if a channel busy ratio measured within a CBR measurement window is higher than a fourth threshold, determine to select resources in the exceptional resource pool to use.

This embodiment is to describe how to do congestion control and use the exceptional resource pool in step 3. In this embodiment, the UE will not take congestion control into account in step 2 and anyhow in step 2, the UE will finally find for example 20% candidate resources based on the current procedure (e.g., by unlimitedly increasing 3 dB for S-RSRP threshold several times) and then go with step 3.

In particular, in step 3 (UE procedure for ranking candidate resources based on measured S-RSSI and selecting resources), the UE will not use the normal resource pool (the current resource pool not including the exceptional resource pool) to transmit sidelink channel data if the CBR of a congestion control measurement window (e.g., 100 ms) is higher than certain threshold. In this case, the UE shall rather use the Exceptional Pool to transmit the sidelink channel data.

Of course, the above embodiments related to steps 2 and 3 do not take the congestion degree of the exceptional resource pool and the priority of the packet to be dropped into account, but the embodiments are not limited to this. If considering the congestion degree of the exceptional resource pool and the priority of the packet, the above embodiment in step 3 can be modified as another embodiment, and this modified embodiment is to describe how the UE uses the exceptional resource pool is based on the CBR of exceptional pool together with the packet priority. In particular, if as a result of the CBR measurement procedure and the priority of UE's sidelink transmission packets in question, i.e., the packet needs to be dropped, then the UE is allowed to use the Exceptional pool in the condition that: the CBR of the Exceptional Pool is below a certain new_ Threshold_3 (i.e., the third condition) and/or, the priority of the packet in question is higher than new_Threshold_4 (i.e., the fourth condition).

That is, in all, whether to use the exceptional resource pool is based on the at least one of the first condition and the second condition as above mentioned, or additionally further based on the at least one of the third condition and the fourth condition as above mentioned.

In other words, the embodiments may include:
1. whether to use the exceptional resource pool is based on the first condition.
2. whether to use the exceptional resource pool is based on the second condition.
3. whether to use the exceptional resource pool is based on the first condition and the second condition (the two conditions should both be met).
4. whether to use the exceptional resource pool is based on the at least one of the first condition and the second condition and the third condition.
5. whether to use the exceptional resource pool is based on the at least one of the first condition and the second condition and the fourth condition.
6. whether to use the exceptional resource pool is based on the at least one of the first condition and the second condition and the third condition and the fourth condition (the two conditions should both be met).

And the determination on whether to use the exceptional resource pool may be performed in the first step (step 2) as above mentioned, or in the second step (step 3) as above mentioned.

Thus, with the embodiments of the present invention, the exceptional resource pool can be efficiently utilized, thereby preventing packet dropping, avoiding congestion of normal resource pool, and improving resource utilization.

Figure 4:
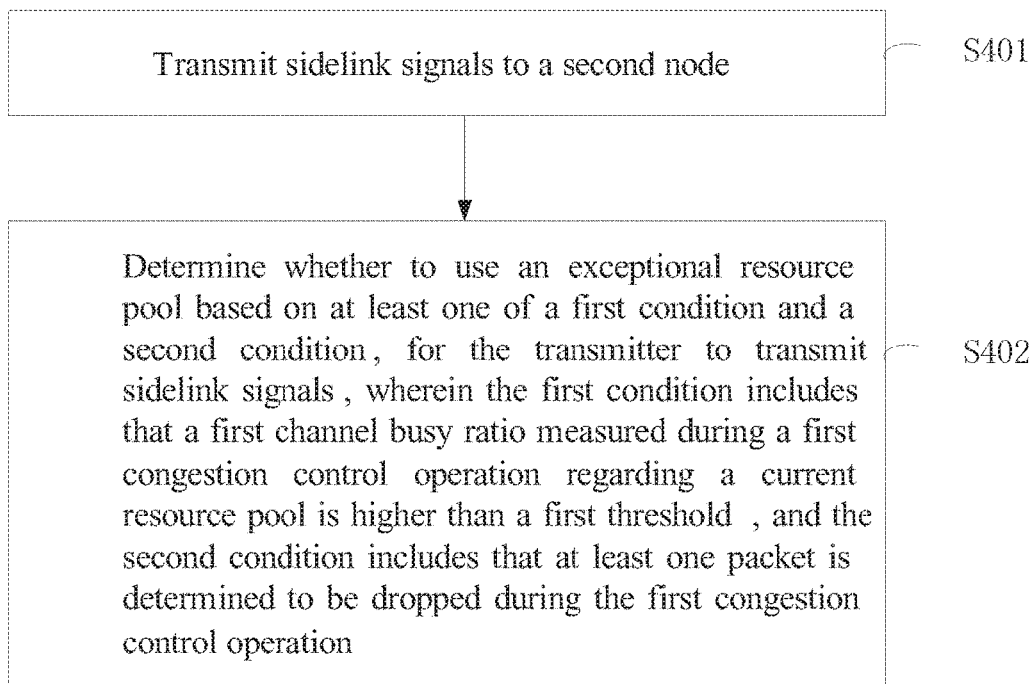
FIG. 4 schematically shows a flowchart of a method at a first node according to an embodiment of the present invention.

FIG. 4 schematically shows a flowchart of a method 400 at a first node according to an embodiment of the present invention.

The method 400 comprises: a step S401 of transmitting sidelink signals to a second node; and a step S402 of determining whether to use an exceptional resource pool based on at least one of a first condition and a second condition, for the transmitter to transmit sidelink signals, wherein the first condition includes that a first channel busy ratio measured during a first congestion control operation regarding a current resource pool is higher than a first threshold, and the second condition includes that at least one packet is determined to be dropped during the first congestion control operation.

In an embodiment, the step of determining S402 further includes determining to use the exceptional resource pool further in a third condition, wherein the third condition includes that a second channel busy ratio measured during a second congestion control operation regarding the exceptional resource pool is lower than a second threshold.

In an embodiment, the second threshold is same with or different from the first threshold.

In an embodiment, the step of determining 402 further includes determining to use the exceptional resource pool further in a fourth condition, wherein the fourth condition includes that priority of the at least one packet determined to be dropped is higher than a third threshold.

In an embodiment, the step of determining S402 includes determining whether to use the exceptional resource pool in a first step of determining a subset of resources to be excluded during Physical Sidelink Shared Channel (PSSCH) resource selection or in a second step of ranking candidate resources based on measured S-RSSI (Sidelink Received Signal Strength Indicator) and selecting resources after performing the first step.

In an embodiment, in a case that the step of determining S402 includes determining whether to use the exceptional resource pool in the first step, the step of determining S402 includes:

increasing a S-RSRP (Sidelink Reference Signal Received Power) threshold to allow more candidate resources within a resource selection window for a predetermined number of times until substantially m % resources of total resources are available; if a channel busy ratio (CBR) measured within a CBR measurement window is higher than a fourth threshold, determining to use the exceptional resource pool without performing the second step; and if CBR measured within a CBR measurement window is not higher than the fourth threshold, performing the second step.

In an embodiment, in a case that the step of determining S402 includes determining whether to use the exceptional resource pool in the first step, the step of determining S402 includes: calculating a ratio of the number of the available resources to the number of all resources without increasing a S-RSRP (Sidelink Reference Signal Received Power) threshold; if the ratio is smaller than a fifth threshold, determining to use the exceptional resource pool without performing the second step; if the ratio is not smaller than the fifth threshold, performing the second step.

In an embodiment, the first step includes increasing a S-RSRP threshold to allow more candidate resources within a resource selection window until substantially m % resources of total resources are available and not including the congestion control operation, in a case that the step of determining S402 includes determining whether to use the exceptional resource pool in the second step after performing the first step, the step of determining S402 includes: if a channel busy ratio measured within a CBR measurement window is higher than a fourth threshold, determining to select resources in the exceptional resource pool to use.

Thus, with the embodiments of the present invention, the exceptional resource pool can be efficiently utilized, thereby preventing packet drop, avoiding resource pool congestion, and improving resource utilization.

Figure 5:
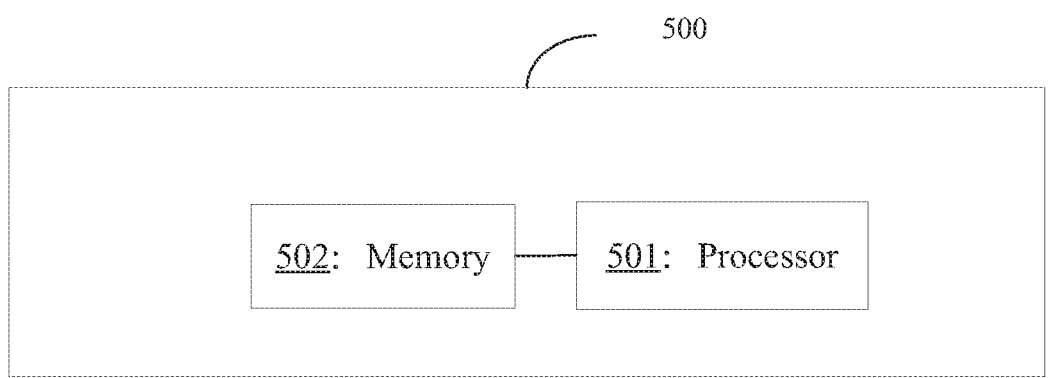
FIG. 5 schematically shows a block diagram of a system at a first node according to an embodiment of the present invention.

FIG. 5 schematically shows a block diagram of a system 500 at a first node according to an embodiment of the present invention.

The system 500, at a first node, comprising: one or more processors 501; a memory 502 coupled with the one or more processors, when executed by the one or more processors, to perform the method 400 as above mentioned with reference to FIG. 4.

Thus, with the embodiments of the present invention, the exceptional resource pool can be efficiently utilized, thereby preventing packet drop, avoiding resource pool congestion, and improving resource utilization.

In addition, embodiments of the present disclosure can at least provide the following subject matters.

1) An apparatus, at a first node, comprising:
a transmitter operative to transmit sidelink signals to a second node; and
a controller operative to determine whether to use an exceptional resource pool based on at least one of a first condition and a second condition, for the transmitter to transmit sidelink signals,
wherein the first condition includes that a first channel busy ratio measured during a first congestion control operation regarding a current resource pool is higher than a first threshold, and the second condition includes that at least one packet is determined to be dropped during the first congestion control operation.

2) The apparatus according to 1), wherein, the controller is operative to determine to use the exceptional resource pool further in a third condition,
wherein the third condition includes that a second channel busy ratio measured during a second congestion control operation regarding the exceptional resource pool is lower than a second threshold.

3) The apparatus according to 2), wherein, the second threshold is same with or different from the first threshold.

4) The apparatus according to 1), wherein, the controller is operative to determine to use the exceptional resource pool further in a fourth condition, wherein, the fourth condition includes that priority of the at least one packet determined to be dropped is higher than a third threshold.

5) The apparatus according to 1), wherein, the controller is operative to determine whether to use the exceptional resource pool in a first step of determining a subset of resources to be excluded during Physical Sidelink Shared Channel (PSSCH) resource selection or in a second step of ranking candidate resources based on measured S-RSSI (Sidelink Received Signal Strength Indicator) and selecting resources after performing the first step.

6) The apparatus according to 1), wherein, in a case that the controller is operative to determine whether to use the exceptional resource pool in the first step, the controller is operative to:
increase a S-RSRP (Sidelink Reference Signal Received Power) threshold to allow more candidate resources within a resource selection window for a predetermined number of times until substantially m % resources of total resources are available;
if a channel busy ratio (CBR) measured within a CBR measurement window is higher than a fourth threshold, determine to use the exceptional resource pool without performing the second step; and
if CBR measured within a CBR measurement window is not higher than the fourth threshold, perform the second step.

7) The apparatus according to 1), wherein, in a case that the controller is operative to determine whether to use the exceptional resource pool in the first step, the controller is operative to:
calculate a ratio of the number of the available resources to the number of all resources without increasing a S-RSRP (Sidelink Reference Signal Received Power) threshold;
if the ratio is smaller than a fifth threshold, determine to use the exceptional resource pool without performing the second step;
if the ratio is not smaller than the fifth threshold, perform the second step.

8) The apparatus according to 5), wherein, the first step includes increasing a S-RSRP threshold to allow more candidate resources within a resource selection window until substantially m % resources of total resources are available and not including the congestion control operation,
in a case that the controller is operative to determine whether to use the exceptional resource pool in the second step after performing the first step, the controller is operative to:
if a channel busy ratio measured within a CBR measurement window is higher than a fourth threshold, determine to select resources in the exceptional resource pool to use.

9) A method, at a first node, comprising:
a step of transmitting sidelink signals to a second node; and
a step of determining whether to use an exceptional resource pool based on at least one of a first condition and a second condition, for the transmitter to transmit sidelink signals,
wherein the first condition includes that a first channel busy ratio measured during a first congestion control operation regarding a current resource pool is higher than a first threshold, and the second condition includes that at least one packet is determined to be dropped during the first congestion control operation.

10) The method according to 9), wherein, the step of determining further includes determining to use the exceptional resource pool further in a third condition, wherein the third condition includes that a second channel busy ratio measured during a second congestion control operation regarding the exceptional resource pool is lower than a second threshold.

11) The method according to 10), wherein, the second threshold is same with or different from the first threshold.

12) The method according to 9), wherein, the step of determining further includes determining to use the exceptional resource pool further in a fourth condition, wherein the fourth condition includes that priority of the at least one packet determined to be dropped is higher than a third threshold.

13) The method according to 9), wherein, the step of determining includes determining whether to use the exceptional resource pool in a first step of determining a subset of resources to be excluded during Physical Sidelink Shared Channel (PSSCH) resource selection or in a second step of ranking candidate resources based on measured S-RSSI (Sidelink Received Signal Strength Indicator) and selecting resources after performing the first step.

14) The method according to 9), wherein, in a case that the step of determining includes determining whether to use the exceptional resource pool in the first step, the step of determining includes:

increasing a S-RSRP (Sidelink Reference Signal Received Power) threshold to allow more candidate resources within a resource selection window for a predetermined number of times until substantially m % resources of total resources are available;

if a channel busy ratio (CBR) measured within a CBR measurement window is higher than a fourth threshold, determining to use the exceptional resource pool without performing the second step; and if CBR measured within a CBR measurement window is not higher than the fourth threshold, performing the second step.

15) The method according to 9), wherein, in a case that the step of determining includes determining whether to use the exceptional resource pool in the first step, the step of determining includes:

calculating a ratio of the number of the available resources to the number of all resources without increasing a S-RSRP (Sidelink Reference Signal Received Power) threshold;

if the ratio is smaller than a fifth threshold, determining to use the exceptional resource pool without performing the second step;

if the ratio is not smaller than the fifth threshold, performing the second step.

16) The method according to 13), wherein, the first step includes increasing a S-RSRP threshold to allow more candidate resources within a resource selection window until substantially m % resources of total resources are available and not including the congestion control operation, in a case that the step of determining includes determining whether to use the exceptional resource pool in the second step after performing the first step, the step of determining includes:

if a channel busy ratio measured within a CBR measurement window is higher than a fourth threshold, determining to select resources in the exceptional resource pool to use.

17) A system, at a first node, comprising:
one or more processors;
a memory coupled with the one or more processors, when executed by the one or more processors, to perform the method according to anyone of 9)-16).

The present disclosure can be realized by software, hardware, or software in cooperation with hardware. Each functional block used in the description of each embodiment described above can be realized by a Large-scale integrated (LSI) as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an integrated circuit (IC), a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An apparatus, at a first node, comprising:
a transmitter operative to transmit sidelink signals to a second node; and
a controller operative to determine whether to use an exceptional resource pool based on a first condition being met and a second condition being met, for the transmitter to transmit sidelink signals,
wherein the first condition includes that a first channel busy ratio measured during a first congestion control operation regarding a current resource pool is higher than a first threshold, and the second condition includes that at least one packet is determined to be dropped during the first congestion control operation.

2. The apparatus according to claim 1, wherein, the controller is operative to determine to use the exceptional resource pool further in a third condition,
wherein the third condition includes that a second channel busy ratio measured during a second congestion control operation regarding the exceptional resource pool is lower than a second threshold.

3. The apparatus according to claim 2, wherein, the second threshold is same with or different from the first threshold.

4. The apparatus according to claim 1, wherein, the controller is operative to determine to use the exceptional resource pool further in a fourth condition,
wherein, the fourth condition includes that priority of the at least one packet determined to be dropped is higher than a third threshold.

5. The apparatus according to claim 1, wherein, the controller is operative to determine whether to use the exceptional resource pool in a first step of determining a subset of resources to be excluded during Physical Sidelink Shared Channel (PSSCH) resource selection or in a second step of ranking candidate resources based on measured S-RSSI (Sidelink Received Signal Strength Indicator) and selecting resources after performing the first step.

6. The apparatus according to claim 5, wherein, in a case that the controller is operative to determine whether to use the exceptional resource pool in the first step, the controller is operative to:
increase a S-RSRP (Sidelink Reference Signal Received Power) threshold to allow more candidate resources within a resource selection window for a predetermined number of times until substantially m % resources of total resources are available;
if a channel busy ratio (CBR) measured within a CBR measurement window is higher than a fourth threshold, determine to use the exceptional resource pool without performing the second step; and
if CBR measured within a CBR measurement window is not higher than the fourth threshold, perform the second step.

7. The apparatus according to claim 5, wherein, in a case that the controller is operative to determine whether to use the exceptional resource pool in the first step, the controller is operative to:
calculate a ratio of the number of the available resources to the number of all resources without increasing a S-RSRP (Sidelink Reference Signal Received Power) threshold;
if the ratio is smaller than a fifth threshold, determine to use the exceptional resource pool without performing the second step; and
if the ratio is not smaller than the fifth threshold, perform the second step.

8. The apparatus according to claim 5, wherein, the first step includes increasing a S-RSRP threshold to allow more candidate resources within a resource selection window until substantially m % resources of total resources are available and not including the congestion control operation,
in a case that the controller is operative to determine whether to use the exceptional resource pool in the second step after performing the first step, the controller is operative to:
if a channel busy ratio measured within a CBR measurement window is higher than a fourth threshold, determine to select resources in the exceptional resource pool to use.

9. A method, at a first node, comprising:
a step of transmitting sidelink signals to a second node; and
a step of determining whether to use an exceptional resource pool based on a first condition being met and a second condition being met, for transmitting sidelink signals,
wherein the first condition includes that a first channel busy ratio measured during a first congestion control operation regarding a current resource pool is higher than a first threshold, and the second condition includes that at least one packet is determined to be dropped during the first congestion control operation.

10. The method according to claim 9, wherein, the step of determining further includes determining to use the exceptional resource pool further in a third condition,
wherein the third condition includes that a second channel busy ratio measured during a second congestion control operation regarding the exceptional resource pool is lower than a second threshold.

11. The method according to claim 10, wherein, the second threshold is same with or different from the first threshold.

12. The method according to claim 9, wherein, the step of determining further includes determining to use the exceptional resource pool further in a fourth condition,
wherein the fourth condition includes that priority of the at least one packet determined to be dropped is higher than a third threshold.

13. The method according to claim 9, wherein, the step of determining includes determining whether to use the exceptional resource pool in a first step of determining a subset of resources to be excluded during Physical Sidelink Shared Channel (PSSCH) resource selection or in a second step of ranking candidate resources based on measured S-RSSI (Sidelink Received Signal Strength Indicator) and selecting resources after performing the first step.

14. The method according to claim 13, wherein, in a case that the step of determining includes determining whether to use the exceptional resource pool in the first step, the step of determining includes:
increasing a S-RSRP (Sidelink Reference Signal Received Power) threshold to allow more candidate resources within a resource selection window for a predetermined number of times until substantially m % resources of total resources are available;
if a channel busy ratio (CBR) measured within a CBR measurement window is higher than a fourth threshold, determining to use the exceptional resource pool without performing the second step; and
if CBR measured within a CBR measurement window is not higher than the fourth threshold, performing the second step.

15. The method according to claim 13, wherein, in a case that the step of determining includes determining whether to use the exceptional resource pool in the first step, the step of determining includes:
- calculating a ratio of the number of the available resources to the number of all resources without increasing a S-RSRP (Sidelink Reference Signal Received Power) threshold;
- if the ratio is smaller than a fifth threshold, determining to use the exceptional resource pool without performing the second step; and
- if the ratio is not smaller than the fifth threshold, performing the second step.

16. The method according to claim 13, wherein, the first step includes increasing a S-RSRP threshold to allow more candidate resources within a resource selection window until substantially m % resources of total resources are available and not including the congestion control operation,
- in a case that the step of determining includes determining whether to use the exceptional resource pool in the second step after performing the first step, the step of determining includes:
- if a channel busy ratio measured within a CBR measurement window is higher than a fourth threshold, determining to select resources in the exceptional resource pool to use.

17. A system, at a first node, comprising:
one or more processors;
a memory coupled with the one or more processors, when executed by the one or more processors, to perform:
a step of transmitting sidelink signals to a second node; and
a step of determining whether to use an exceptional resource pool based on a first condition being met and a second condition being met, for transmitting sidelink signals,
wherein the first condition includes that a first channel busy ratio measured during a first congestion control operation regarding a current resource pool is higher than a first threshold, and the second condition includes that at least one packet is determined to be dropped during the first congestion control operation.

* * * * *